United States Patent
Fujii

(10) Patent No.: US 7,260,466 B2
(45) Date of Patent: Aug. 21, 2007

(54) TURBINE MECHANICAL OUTPUT COMPUTATION DEVICE AND GAS TURBINE CONTROL DEVICE EQUIPPED THEREWITH

(75) Inventor: Fuminori Fujii, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 399 days.

(21) Appl. No.: 10/965,150

(22) Filed: Oct. 15, 2004

(65) Prior Publication Data

US 2005/0131616 A1     Jun. 16, 2005

(30) Foreign Application Priority Data

Dec. 11, 2003   (JP)   ............................. 2003-412870

(51) Int. Cl.
*G06F 19/00* (2006.01)
(52) U.S. Cl. ..................................................... 701/100
(58) Field of Classification Search ................. 701/100
See application file for complete search history.

(56) References Cited

U.S. PATENT DOCUMENTS

| 4,994,684 A * | 2/1991 | Lauw et al. ................... 290/52 |
| 2002/0152754 A1 * | 10/2002 | MacKay ....................... 60/772 |
| 2004/0094964 A1 * | 5/2004 | Mikhail et al. ................ 290/44 |
| 2004/0200207 A1 | 10/2004 | McKelvey et al. |

FOREIGN PATENT DOCUMENTS

| DE | 41 08 787 A1 | 9/1991 |
| JP | 7-111148 | 11/1995 |
| WO | WO 03/062617 A1 | 7/2003 |

OTHER PUBLICATIONS

German Office Action dated Feb. 7, 2006.

* cited by examiner

*Primary Examiner*—Thu V. Nguyen
(74) *Attorney, Agent, or Firm*—Westerman, Hattori, Daniels & Adrian, LLP.

(57) ABSTRACT

A turbine mechanical output computation device computes a gas turbine mechanical output P from the following equation $$P = Pe + J \times g \times \left(\frac{2\pi}{60}\right)^2 \times N \times \frac{dN}{dt}$$

where Pe represents a generator effective power measured by a generator effective power wattmeter, N represents the rotational speed of a gas turbine measured by a gas turbine tachometer, J represents the moment of inertia of the gas turbine, and g represents gravitational acceleration. A combustion air amount controller controls the amount of combustion air based on the gas turbine mechanical output P.

2 Claims, 1 Drawing Sheet

TURBINE MECHANICAL OUTPUT COMPUTATION DEVICE AND GAS TURBINE CONTROL DEVICE EQUIPPED THEREWITH

CROSS REFERENCE TO RELATED APPLICATION

The entire disclosure of Japanese Patent Application No. 2003-412870 filed on Dec. 11, 2003, including specification, claims, drawings and summary, is incorporated herein by reference in its entirety.

BACKGROUND OF THE INVENTION

1. Field of the Invention

This invention relates to a turbine mechanical output computation device for computing the mechanical output of a turbine which rotationally drives a generator, and a gas turbine control device equipped with the turbine mechanical output computation device.

2. Description of the Related Art

In controlling a lowNOx combustor in a gas turbine, it is necessary to maintain the ratio between the amounts of fuel and combustion air, which are supplied to the combustor, i.e., fuel-air ratio, at a value in a predetermined range. For this purpose, the amount of fuel needs to be detected accurately and promptly.

In the fuel-air ratio control of the gas turbine by a gas turbine control device, the mechanical output of the gas turbine has been taken as an indicator of the amount of fuel. To measure the gas turbine mechanical output, generator output (generator effective power) has been used. That is, based on the relationship of the equation shown below, generator output is used as a signal representing the amount of fuel. The reason for the use of generator output is that compared with a flow meter for measuring the amount of fuel, a power converter (generator effective power wattmeter) for measuring the output of a generator is characterized by high precision, high speed detection, and high reliability (multiplexing is also easy).

Amount of fuel=Amount of energy fed into gas turbine=Gas turbine mechanical output=Generator output Japanese Patent Publication No. 1995-111148 discloses an example of an acceleration control method for a two-shaft gas turbine using a gas turbine rotational speed signal.

When a generator effective power wattmeter is used for measuring gas turbine mechanical output, as described above, all of gas turbine mechanical output is converted into generator output, in an ordinary stable operating state where the gas turbine rotates at a constant rotational speed. Thus, the following relationship holds, and no problem is posed:

Gas turbine mechanical output=Generator output (Generator effective power)

Generally, however, even when the amount of fuel supplied to the combustor is nearly constant, and the generator is operated with constant output, there may be a case where disturbance occurs in an electric power system to which the generator is connected (i.e., such as switching of a power transmission system). In this case, current fluctuations occur in the electric power system, causing changes in effective power, reactive power, and power factor. That is, in the event of a disturbance in the electric power system or the like, the electric power system falls into a state where it cannot receive electric power stably, with the result that the relationship of the above equation is transiently impaired. In such a state, not all of the gas turbine mechanical output is converted into the generator output, and the portion of the gas turbine mechanical output not converted into the generator output is converted into the rotational energy of the gas turbine. As a result, the rotational speed of the gas turbine changes. In such a transient period, therefore, fuel-air ratio control deviates from the optimal state, thus presenting problems, such as the occurrence of combustion vibrations in the combustor. The occurrence of combustion vibrations becomes the cause of a misfire in or damage to the combustor.

SUMMARY OF THE INVENTION

The present invention has been accomplished in the light of the above-mentioned circumstances. It is the object of the invention to provide a turbine mechanical output computation device which can find gas turbine mechanical output more accurately, and can thereby maintain the fuel-air ratio of a combustor in an appropriate range, even in a transient state where because of a disturbance in an electric power system or the like, generator output fluctuates to vary a gas turbine rotational speed; and also to provide a gas turbine control device equipped with the turbine mechanical output computation device.

A turbine mechanical output computation device, as a first aspect of the invention for attaining the above-mentioned object, is a turbine mechanical output computation device for computing the mechanical output of a turbine for rotationally driving a generator, the turbine mechanical output computation device being adapted to compute the mechanical output of the turbine from the following equation $$P = Pe + J \times g \times \left(\frac{2\pi}{60}\right)^2 \times N \times \frac{dN}{dt}$$

where Pe represents the output of the generator measured by generator output measuring means, N represents the rotational speed of the turbine measured by turbine rotational speed measuring means, J represents the moment of inertia of the turbine, and g represents gravitational acceleration.

According to the turbine mechanical output computation device as the first aspect of the invention, not only is the generator output used, but the computation of the above equation is also performed; namely, corrections are made based on fluctuations in the turbine rotational speed. Under these conditions, the turbine mechanical output is determined. Thus, even in the transient state where the generator output fluctuates owing to a disturbance in the electric power system or the like, whereupon the gas turbine rotational speed varies, the turbine mechanical output can be obtained more accurately.

Another aspect of the invention is a gas turbine control device, comprising: the turbine mechanical output computation device as the first aspect of the invention; fuel amount control means for controlling the amount of fuel, which is supplied to a combustor, based on a set load value and the generator output measured by the generator output measuring means; and combustion air amount control means for controlling the amount of combustion air, which is supplied to the combustor, based on a gas turbine mechanical output computed by the turbine mechanical output computation device.

According to the gas turbine control device as the second aspect of the invention, even in the transient state where the generator effective power measured by an electric power converter fluctuates owing to a disturbance in the electric power system or the like, whereupon the gas turbine rotational speed varies, the amount of combustion air can be controlled based on the correct gas turbine mechanical output determined by the gas turbine mechanical output computation device. As a result, the fuel-air ratio of the combustor can be held in an appropriate range. Consequently, the occurrence of combustion vibrations, etc. in the combustor can be decreased, and combustion becomes stable, so that the operability of the gas turbine can be improved and shortening of its life can be curtailed.

BRIEF DESCRIPTION OF THE DRAWING

The present invention will become more fully understood from the detailed description given hereinbelow and the accompanying drawing which is given by way of illustration only, and thus is not limitative of the present invention, and wherein.

DETAILED DESCRIPTION OF THE INVENTION

Figure 1:
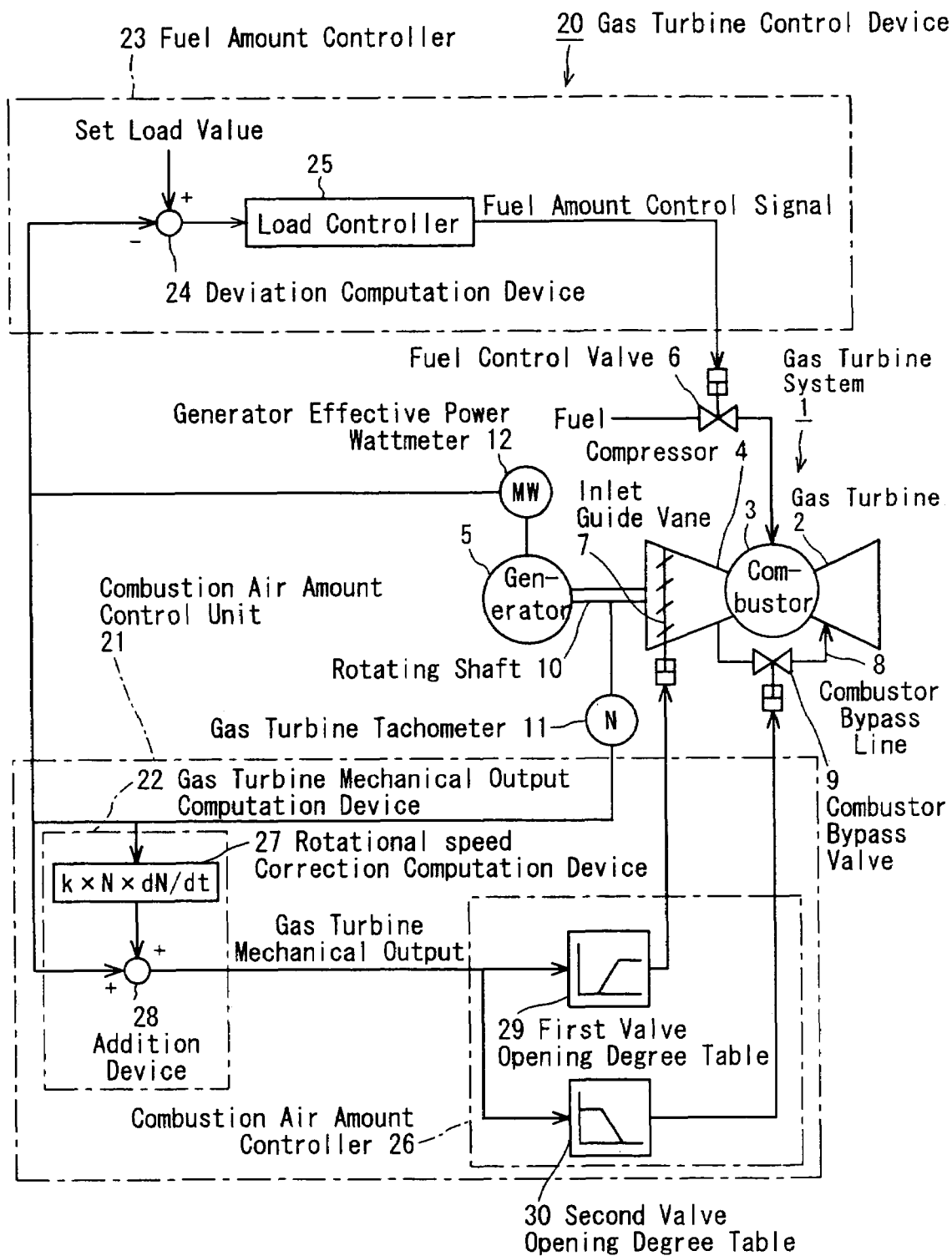
FIG. 1 is a block diagram showing the configuration of a gas turbine control device equipped with a turbine mechanical output computation device according to an embodiment of the present invention.

An embodiment of the present invention will now be described in detail with reference to the accompanying drawing, but in no way limits the invention.

As shown in FIG. 1, a gas turbine system 1 has a gas turbine 2, a combustor 3, a compressor 4, a generator 5, and a gas turbine control device 20 for controlling these members.

The combustor 3 is placed upstream of the gas turbine 2, and is interposed between the gas turbine 2 and the compressor 4. A rotating shaft of the gas turbine 2, a rotating shaft of the compressor 4, and a rotating shaft 10 of the generator 5 are connected together so that the compressor 4 and the generator 5 may be rotationally driven by the gas turbine 2.

A fuel control valve 6 is connected to the combustor 3, and the adjustment of the opening degree of the fuel control valve 6 results in the adjustment of the amount of fuel supplied from fuel supply equipment (not shown) to the combustor 3. The compressor 4 is furnished with an inlet guide vane (variable vane) 7, and the amount of intake air for the compressor 4 is adjusted by the adjustment of the opening degree of the inlet guide vane 7, whereby the amount of compressed air supplied from the compressor 4 to the combustor 3 can be adjusted. A combustor bypass valve 9 is provided on a combustor bypass line 8 leading from the upstream side (compressor side) to the downstream side (gas turbine side) of the combustor 3, and the amount of compressed air supplied from the compressor 4 to the combustor 3 can also be adjusted by adjusting the opening degree of the combustor bypass valve 9.

In the combustor 3, fuel supplied from the fuel supply equipment is mixed with compressed air supplied from the compressor 4, and is combusted to form a combustion gas, which rotates the gas turbine 2. As a result, the compressor 4 is rotationally driven by the gas turbine 2 to form compressed air, while the generator 5 is rotationally driven by the gas turbine 2 to generate electricity. The electric power of the resulting electricity is delivered to the electric power system (not shown) to which the generator 5 is connected.

The rotational speed of the gas turbine 2 is measured by a gas turbine tachometer 11 as turbine rotational speed measuring means. The output of the generator 5 (i.e., generator effective power) is measured by a generator effective power wattmeter 12 as generator output measuring means.

The gas turbine control device 20 has a fuel amount controller 23 as fuel amount control means, and a combustion air amount control unit 21. The combustion air amount control unit 21 is provided with a gas turbine mechanical output computation device 22, and a combustion air amount controller 26 as combustion air amount control means. Each of the devices constituting the gas turbine control device 20 may be composed of computer software or hardware.

In the fuel amount controller 23, the amount of fuel supplied to the combustor 3 is controlled based on a set load value which is the target value of the generator output (generator effective power), and the generator output (generator effective power) measured by the generator effective power wattmeter 12.

In detail, the fuel amount controller 23 has a deviation computation device 24, and a load controller 25. In the deviation computation device 24, a deviation between the set load value and the generator output (generator effective power) measured by the generator effective power watt meter 12 is determined by computation. The load controller 25 exercises, for example, PID control to issue a fuel amount control signal, which corresponds to the deviation determined by the deviation computation device 24, to the fuel control valve 6. Based on this fuel amount control signal, the opening degree of the fuel control valve 6 is controlled to control the amount of fuel supplied from the fuel supply equipment to the combustor 3. Thus, the amount of fuel supplied to the combustor 3 becomes an amount corresponding to the set load value, and generator output equals the set load value.

In the gas turbine mechanical output computation device 22, the mechanical output P of the gas turbine 2 is computed from the following equation (1) based on the generator output (generator effective power) Pe measured by the generator effective power wattmeter 12, the gas turbine rotational speed N measured by the gas turbine tachometer 11, the moment of inertia, J, of the gas turbine 2, and gravitational acceleration g:

$$P = Pe + J \times g \times \left(\frac{2\pi}{60}\right)^2 \times N \times \frac{dN}{dt} \quad (1)$$

The equation (1) is based on the equation of motion of a rotor. That is, the equation (2) indicated below, which is the equation of motion of a rotor, gives the equation (3) indicated blew below, which is an equation of the gas turbine mechanical output P. The angular velocity o of the gas turbine 2 in the equation (3) is given by the equation (4) indicated below. Thus, substitution of the equation (4) into the equation (3) yields the aforementioned equation (1).

$$J \times \frac{d\omega}{dt} = \frac{P - Pe}{g \times \omega} \quad (2)$$

$$P = Pe + J \times g \times \omega \times \frac{d\omega}{dt} \quad (3)$$

$$\omega = 2 \times \pi \times \frac{N}{60} \quad (4)$$

J: Moment of inertia of turbine [kg·m²]
ω: Angular velocity of turbine [rad/sec]

P: Turbine mechanical output [W]
Pe: Generator effective power [W]
N: Turbine rotational speed [rpm]
g: Gravitational acceleration [m/sec$^2$]

The present invention will be described in concrete terms based on FIG. 1. The gas turbine mechanical output computation device 22 has a rotational speed correction computation device 27, and an addition device 28. In the rotational speed correction computation device 27, a computation of the expression (5) indicated below is performed. The expression (5) is an expression corresponding to the second term on the right side of the equation (1), and K in the expression (5) is a constant given by the equation (6) indicated below. In the addition device 28, the results of computation of the expression (5) in the rotational speed correction computation device 27, and the generator output (generation effective power) Pe measured by the generator effective power wattmeter 12 are added together (namely, the computation of the equation (1) is performed) to find the gas turbine mechanical output P, which is outputted to the combustion air amount controller 26.

$$K \times N \times \frac{dN}{dt} \quad (5)$$

$$K = J \times g \times \left(\frac{2\pi}{60}\right)^2 \quad (6)$$

The combustion air amount controller 26 controls the amount of combustion air, which is supplied to the combustor 3, based on the gas turbine mechanical output computed by the gas turbine mechanical output computation device 22.

In detail, the combustion air amount controller 26 has a first valve opening degree table 29, and a second valve opening degree table 30. The first valve opening degree table 29 is a table showing the relationship between the gas turbine mechanical output P (the abscissa in the drawing) and the opening degree of the inlet guide vane 7 (the ordinate in the drawing). This table was established beforehand by computations and tests. The second valve opening degree table 30 is a table showing the relationship between the gas turbine mechanical output P (the abscissa in the drawing) and the opening degree of the combustor bypass valve 9 (the ordinate in the drawing). This table was established beforehand by computations and tests. Here, the gas turbine mechanical output P serves as an indicator of the amount of fuel supplied to the combustor 3. Thus, the first valve opening degree table 29 functions as a table showing the relationship between the amount of fuel and the opening degree of the inlet guide vane (i.e., the amount of combustion air), while the second valve opening degree table 30 functions as a table showing the relationship between the amount of fuel and the opening degree of the combustor bypass valve (i.e., the amount of combustion air).

Hence, the first valve opening degree table 29 outputs an inlet guide vane opening degree signal responsive to the gas turbine mechanical output P (the amount of fuel), and the opening degree of the inlet guide vane 4 is adjusted based on the inlet guide vane opening degree signal. The second valve opening degree table 30 outputs a combustor bypass valve opening degree signal responsive to the gas turbine mechanical output P (the amount of fuel), and the opening degree of the combustor bypass valve 9 is adjusted based on the combustor bypass valve opening degree signal. In this manner, the amount of combustion air (the amount of compressed air) to be supplied to the combustor 3 becomes an optimal amount for the amount of fuel to be supplied to the combustor 3. Thus, the ratio of the amount of fuel to the amount of combustion air (fuel-air ratio) is maintained in a predetermined range. In the illustrated embodiment, when the load (gas turbine mechanical output) is high, the amount of combustion air is adjusted mainly by adjusting the opening degree of the inlet guide vane 7. When the load (gas turbine mechanical output) has decreased, the opening degree of the combustor bypass valve 9 is also adjusted to adjust the amount of combustion air.

According to the gas turbine mechanical output computation device 22 of the present embodiment, as described above, not only is the generator effective power Pe used, but the computation of the equation (1) is also performed; namely, corrections are made based on fluctuations in the rotational speed N of the gas turbine (see the aforementioned expression (5)). Under these conditions, the gas turbine mechanical output P is determined. Thus, even in the transient state where the generator effective power fluctuates owing to a disturbance in the electric power system or the like, whereupon the gas turbine rotational speed N varies, the gas turbine mechanical output P can be obtained more accurately.

The gas turbine control device 20 of the present embodiment is equipped with the above-described gas turbine mechanical output computation device 22; the fuel amount controller 23 for controlling the amount of fuel, which is supplied to the combustor 3, based on the set load value and the generator output (generator effective power) measured by the generator effective power wattmeter 12; and the combustion air amount controller 26 for controlling the amount of combustion air, which is supplied to the combustor 3, based on the gas turbine mechanical output P computed by the gas turbine mechanical output computation device 22. Thus, even in the transient state where the generator effective power measured by the generator effective power wattmeter 12 fluctuates owing to a disturbance in the electric power system or the like, whereupon the gas turbine rotational speed N varies, the amount of combustion air can be controlled based on the correct gas turbine mechanical output P determined by the gas turbine mechanical output computation device 22. As a result, the fuel-air ratio of the combustor 3 can be held in an appropriate range. Consequently, the occurrence of combustion vibrations, etc. in the combustor 3 can be decreased, and combustion becomes stable, so that the operability of the gas turbine 2 can be improved and shortening of its life can be curtailed.

While the present invention has been described by the foregoing embodiment, it is to be understood that the invention is not limited thereby, but may be varied in many other ways. Such variations are not to be regarded as a departure from the spirit and scope of the invention, and all such modifications as would be obvious to one skilled in the art are intended to be included within the scope of the appended claims.

What is claimed is:

1. A turbine mechanical output computation device for computing a mechanical output of a turbine for rotationally driving a generator, said turbine mechanical output computation device being adapted to compute said mechanical output of said turbine from the following equation $$P = Pe + J \times g \times \left(\frac{2\pi}{60}\right)^2 \times N \times \frac{dN}{dt}$$

where Pe represents an output of said generator measured by generator output measuring means, N represents a rotational speed of said turbine measured by turbine rotational speed measuring means, J represents a moment of inertia of said turbine, g represents gravitational acceleration, and dN/dt is a differential of the rotational speed of said turbine.

2. A gas turbine control device, comprising:

a turbine mechanical output computation device for computing a mechanical output of a turbine for rotationally driving a generator;

fuel amount control means for controlling an amount of fuel, which is supplied to a combustor, based on a set load value and said generator output measured by said generator output measuring means; and combustion air amount control means for controlling an amount of combustion air, which is supplied to said combustor, based on a gas turbine mechanical output computed by said turbine mechanical output computation device; wherein said turbine mechanical output computation device being adapted to compute said mechanical output of said turbine from the following equation $$P = Pe + J \times g \times \left(\frac{2\pi}{60}\right)^2 \times N \times \frac{dN}{dt}$$

where Pe represents an output of said generator measured by generator output measuring means, N represents a rotational speed of said turbine measured by turbine rotational speed measuring means, J represents a moment of inertia of said turbine, g represents gravitational acceleration. and dN/dt is a differential of the rotational speed of said turbine.

* * * * *